(12) United States Patent
Luttinen et al.

(10) Patent No.: US 9,238,391 B1
(45) Date of Patent: Jan. 19, 2016

(54) VEHICLE AND A SUSPENSION SYSTEM FOR THE VEHICLE

(71) Applicant: GM GLOBAL TECHNOLOGY OPERATIONS LLC, Detroit, MI (US)

(72) Inventors: James L. Luttinen, Brighton, MI (US); Jeffry Pniewski, Dryden, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 10 days.

(21) Appl. No.: 14/335,391

(22) Filed: Jul. 18, 2014

(51) Int. Cl.
*B60G 7/00* (2006.01)
*B60G 11/18* (2006.01)
*B62D 7/22* (2006.01)
*B62D 35/00* (2006.01)

(52) U.S. Cl.
CPC .............. *B60G 7/006* (2013.01); *B60G 11/181* (2013.01); *B62D 7/228* (2013.01); *B62D 35/007* (2013.01)

(58) Field of Classification Search
CPC ...... B60G 7/006; B60G 11/181; B62D 7/228; B62D 35/007
USPC ........................ 280/124.135, 5.514
See application file for complete search history.

(56) References Cited

U.S. PATENT DOCUMENTS

| 2,071,577 | A | * | 2/1937 | Renwick | B60G 3/26 267/230 |
| 2,998,241 | A | * | 8/1961 | Eyb | B60G 3/06 267/276 |
| 3,027,177 | A | * | 3/1962 | Karlstad, Jr. | B60G 17/025 267/222 |
| 4,168,075 | A | * | 9/1979 | Matschinsky | B60G 7/006 280/124.128 |
| 4,540,197 | A | * | 9/1985 | Finn | B60G 11/181 267/25 |
| 6,182,979 | B1 | * | 2/2001 | Lee | B60G 3/20 280/5.506 |
| 8,454,041 | B2 | * | 6/2013 | Fujii | B60G 3/20 280/124.125 |

* cited by examiner

*Primary Examiner* — Faye M Fleming
(74) *Attorney, Agent, or Firm* — Quinn Law Group, PLLC

(57) ABSTRACT

A vehicle and a suspension system for the vehicle are disclosed. The suspension system includes a wheel knuckle and a control arm coupled to the wheel knuckle. The control arm includes a proximal end having a first arm segment and a second arm segment each extending outwardly from the proximal end away from each other to respective first and second distal ends to define a space between the first and second arm segments. The suspension system also includes a biasing device at least partially disposed in the space between the first and second arm segments. The biasing device is coupled to at least one of the first and second distal ends of the first and second arm segments respectively such that actuation of the biasing device provides a first reaction force that counteracts a downward load.

20 Claims, 3 Drawing Sheets

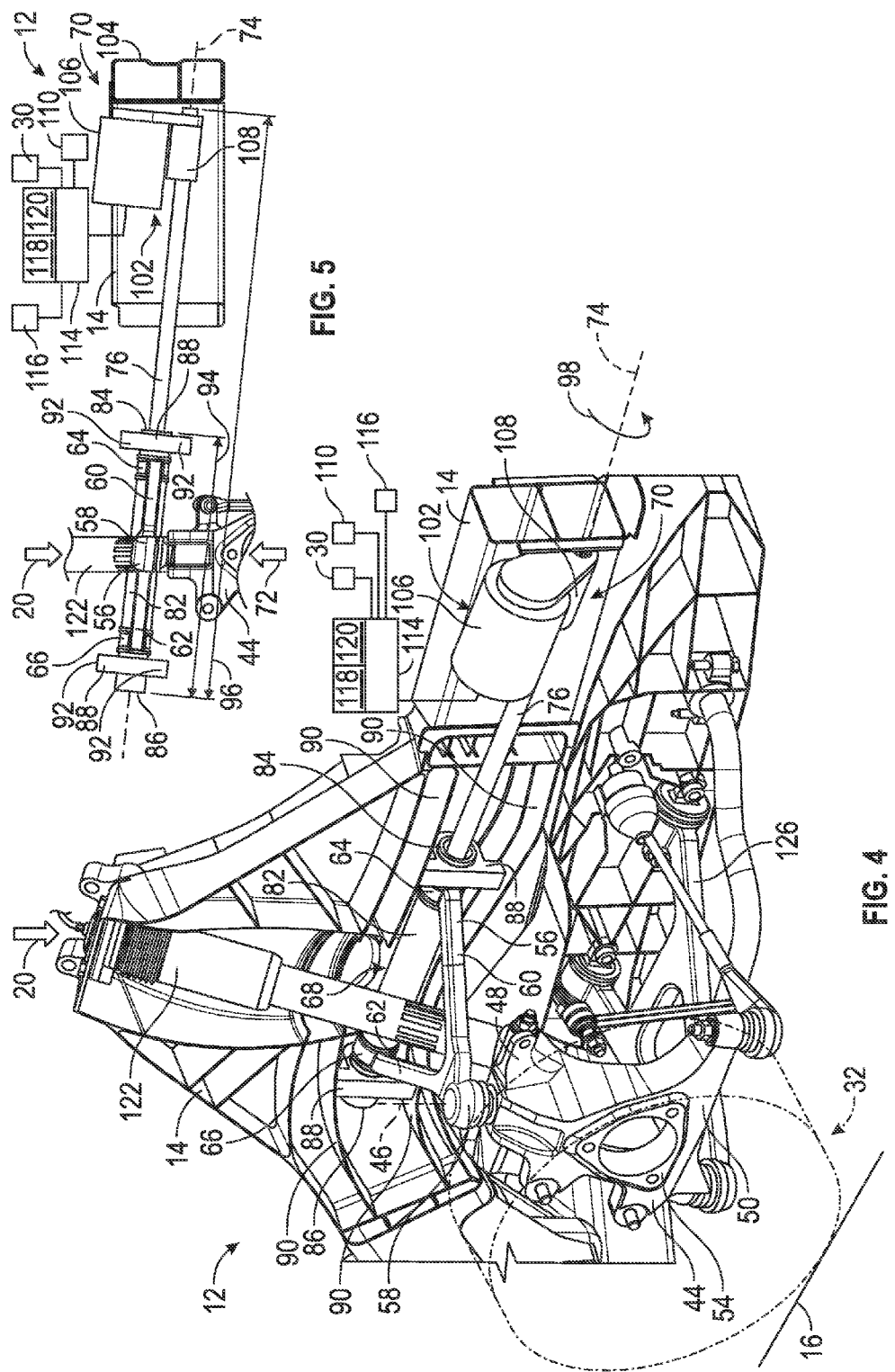

VEHICLE AND A SUSPENSION SYSTEM FOR THE VEHICLE

TECHNICAL FIELD

The present disclosure relates to a vehicle and a suspension system for the vehicle.

BACKGROUND

Many vehicles have a suspension system. When a vehicle travels over a bump or a hole in a road, the suspension system can control various forces between a sprung mass of the vehicle and the road which provides a smooth ride. For example, some cars and trucks have been designed with a suspension system including a coil-over shock having a coil spring and a piston cylinder device. The coil spring surrounds the piston cylinder device, and the coil spring and the piston cylinder device cooperate to generate forces that dampen movement of the sprung mass.

Additionally, some truck designs include a suspension system having a torsion bar that acts as a spring. The torsion bar is utilized instead of the coil spring discussed above. The torsion bar is attached to an outside surface of a lower control arm and a wheel knuckle is coupled to the lower control arm. The torsion bar is twisted to apply a moment force that acts on the lower control arm as a vertical force to suspend the sprung mass of the truck. A large packaging space is utilized to provide room for the torsion bar to be attached to the lower control arm at the outside surface.

In addition, some sport cars have been designed having a spoiler on a trunk of the car to increase a downforce applied to the sprung mass of the car. The suspension system of the car can include the coil-over shock discussed above. The downforce applied to the sprung mass of the car due to the spoiler can cause the sprung mass of the car to move downwardly toward the road. To counteract this downforce, a hydraulic actuator can be operatively coupled to the coil-over shock to adjust the seat height of the coil spring of the coil-over shock. Adjusting the seat height changes the amount of compression of the coil spring that counteracts the downforce. Another alternative to counteract this downforce is to utilize a heave spring, which is operatively coupled to the coil-over shocks of opposing wheels, and in this configuration, can counteract the downforce when both sides of the vehicle experience simultaneous vertical travel.

SUMMARY

The present disclosure provides a suspension system for a vehicle. The suspension system includes a wheel knuckle and a control arm coupled to the wheel knuckle. The control arm includes a proximal end having a first arm segment and a second arm segment each extending outwardly from the proximal end away from each other to respective first and second distal ends to define a space between the first and second arm segments. The suspension system also includes a biasing device at least partially disposed in the space between the first and second arm segments. The biasing device is coupled to at least one of the first and second distal ends of the first and second arm segments respectively such that actuation of the biasing device provides a first reaction force that counteracts a downward load acting on the control arm. The first reaction force is substantially proportional to the downward load to substantially maintain a position of the wheel knuckle.

The present disclosure also provides a vehicle including a structure and a suspension system supporting the structure. The suspension system includes a wheel knuckle and a control arm coupled to the wheel knuckle. The control arm includes a proximal end having a first arm segment and a second arm segment each extending outwardly from the proximal end away from each other to respective first and second distal ends to define a space between the first and second arm segments. The suspension system further includes a biasing device at least partially disposed in the space between the first and second arm segments. The biasing device is coupled to at least one of the first and second distal ends of the first and second arm segments respectively such that actuation of the biasing device provides a first reaction force that counteracts a downward load applied to the structure. The first reaction force is substantially proportional to the downward load to substantially maintain a vertical position of the structure relative to the wheel knuckle.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

BRIEF DESCRIPTION OF THE DRAWINGS

FIG. 4 is a schematic perspective view of the suspension system.

FIG. 5 is a schematic fragmentary side view of the suspension system.

DETAILED DESCRIPTION

Those having ordinary skill in the art will recognize that terms such as "above", "below", "upward", "up", "downward", "down", "top", "bottom", "left", "right", etc., are used descriptively for the figures, and do not represent limitations on the scope of the disclosure, as defined by the appended claims. Furthermore, the term "substantially" can refer to a slight imprecision or slight variance of a condition, quantity, value, or dimension, etc.

Figure 1:
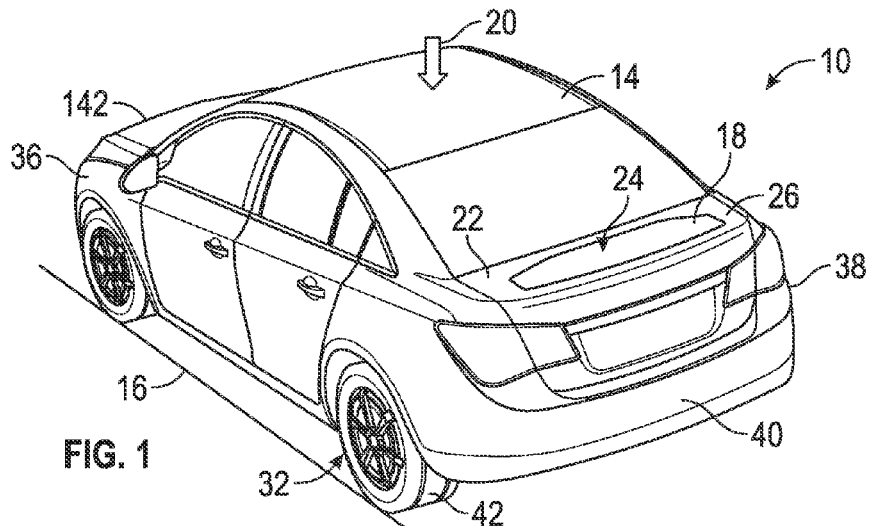
FIG. 1 is a schematic perspective view of a vehicle, with a spoiler retracted.

Referring to the Figures, wherein like numerals indicate like or corresponding parts throughout the several views, a vehicle 10 is generally shown in FIG. 1 and a suspension system 12 for the vehicle 10 is generally shown in FIGS. 3-6. The vehicle 10 can be an automotive vehicle, such as, a car, a sports car, a truck, etc. Furthermore, the vehicle 10 can be a hybrid vehicle utilizing an internal combustion engine and one or more motor-generators. Additionally, the vehicle 10 can be an electric vehicle utilizing one or more motor-generators and eliminating the internal combustion engine. As another example, the vehicle 10 can be a vehicle utilizing the internal combustion engine and eliminating the motor-generator(s). It is to be appreciated that the vehicle 10 can alternatively be a non-automotive vehicle.

Figure 2:
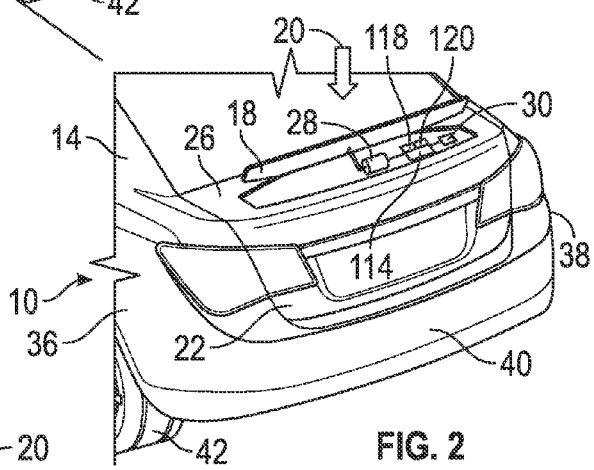
FIG. 2 is a schematic fragmentary perspective view of the vehicle with the spoiler extended.

As best shown in FIGS. 1, 2 and 4, the vehicle 10 can include a structure 14. Generally, the suspension system 12 supports the structure 14 and the structure 14 is spaced from a road 16 or the ground. When a vehicle 10 travels over a bump or a hole in a road 16, the suspension system 12 can dampen movement of the structure 14 toward and away from the road 16 which provides a smooth ride. In other words, the suspension system 12 can dampen vertical movement of the structure 14 relative to the road 16. The structure 14 can be one or more of: a chassis, a support structure, a frame, a subframe, a body, a brace, a panel, an outer skin, a beam, etc. Simply stated, the structure 14 can be any component of a sprung mass of the vehicle 10, including for example, the body, the frame, the subframe, the chassis, the outer skin, or any load-bearing component which is supported by the suspension system 12. It is to be appreciated that the structure 14 can be any suitable configuration.

Optionally, the vehicle 10 can include a spoiler 18 (see FIGS. 1 and 2) or tail fin that can be retracted or extended to change a downward load (the downward load is identified by arrow 20 in FIGS. 1, 2 and 4) applied to the structure 14 or sprung mass of the vehicle 10. The downward load can be a downforce applied to the structure 14. The spoiler 18 is exposed outside of the vehicle 10 and can, for example, be movably coupled to a rear trunk 22 of the vehicle 10. The spoiler 18 is retracted in FIG. 1 and extended in FIG. 2. The retracted position is when an outer surface 24 of the spoiler 18 and an outer surface 26 of the outer skin are substantially flush with each other, and therefore, the extended position of the spoiler 18 can be any position that is not the retracted position. In other words, the extended position of the spoiler 18 is when the outer surface 24 of the spoiler 18 is not substantially flush with the outer surface 26 of the outer skin.

The spoiler 18 can be adjusted automatically or manually. For example, as shown in FIG. 2, a first motor 28 can be coupled to the spoiler 18 to move the spoiler 18 to a desired position, extended or retracted. The first motor 28 can be an electro-mechanical motor, an electric motor or any other suitable mechanism to move the spoiler 18. It is to be appreciated that a position sensor 30 can be coupled to the spoiler 18 or a part of the first motor 28 to sense the position of the spoiler 18.

As the vehicle 10 moves, aerodynamics create the downward load (arrow 20) that is applied to the vehicle 10, and more specifically, applied to the structure 14 or sprung mass. Therefore, by extending or retracting the spoiler 18, aerodynamics of the vehicle 10 changes, and thus, the downward load applied to the structure 14 changes. Generally, when the spoiler 18 is extended, a first downward load is applied to the structure 14 and when the spoiler 18 is retracted, a second downward load is applied to the structure 14, with the first download force being greater than the second downward load. For example, by increasing the downward load applied to the structure 14 or sprung mass, the cornering of the vehicle 10 can be improved as compared to when a lower downward load is applied to the structure 14/sprung mass. The suspension system 12 discussed herein can counteract the downward load applied to the structure 14 to allow high speed cornering. Specifically, the suspension system 12 can actively adjust to counteract the downward load applied to the structure 14. It is to be appreciated that when utilizing the spoiler 18, the spoiler 18 can be in any suitable location and configuration.

Figure 6:
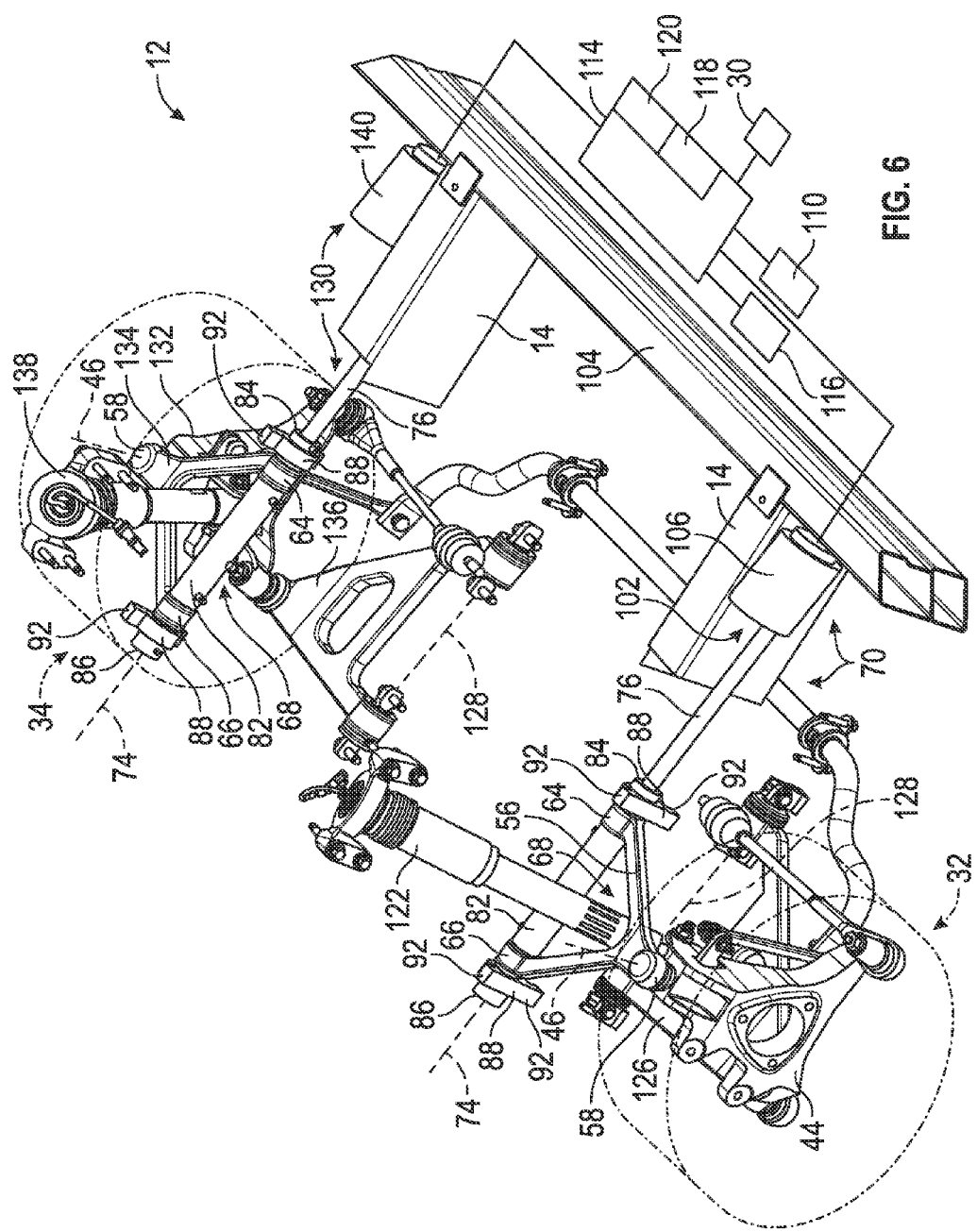
FIG. 6 is a schematic perspective view of the suspension system including a biasing device for one wheel of the vehicle and another biasing device for another wheel of the vehicle.

As best shown in FIGS. 1 and 6, the vehicle 10 can also include a first wheel assembly 32 and in certain embodiments, a second wheel assembly 34. The wheel assemblies 32, 34 rotate over the road 16 and are coupled to the suspension system 12. The wheel assemblies 32, 34 can be disposed on opposite sides of the vehicle 10, such as left and right sides of the vehicle 10. For example, the first wheel assembly 32 can be disposed along a driver's side 36 of the vehicle 10 and the second wheel assembly 34 can be disposed along a passenger's side 38 of the vehicle 10. Furthermore, the first and second wheel assemblies 32, 34 can be for a rear 40 of the vehicle 10, a front 142 of the vehicle 10 or any other suitable location of the vehicle 10. When the first and second wheel assemblies 32, 34 are for the rear 40 of the vehicle 10, the wheel assemblies 32, 34 can be referred to as rear wheel assemblies 32, 34.

The first and second wheel assemblies 32, 34 each include a tire 42 (as shown in solid lines in FIG. 1 and shown in phantom lines in FIGS. 4 and 6) and a hub supporting respective tires 42. The downward load, discussed above, is a downward force applied to the structure 14 which is transferred to the tires 42 and assists in creating grip between the tires 42 and the road 16. For example, when increasing the downward load applied to the structure 14, the downward force transferred to or acting on the tires 42 increase which creates more grip between the tires 42 and the road 16.

Figure 3:
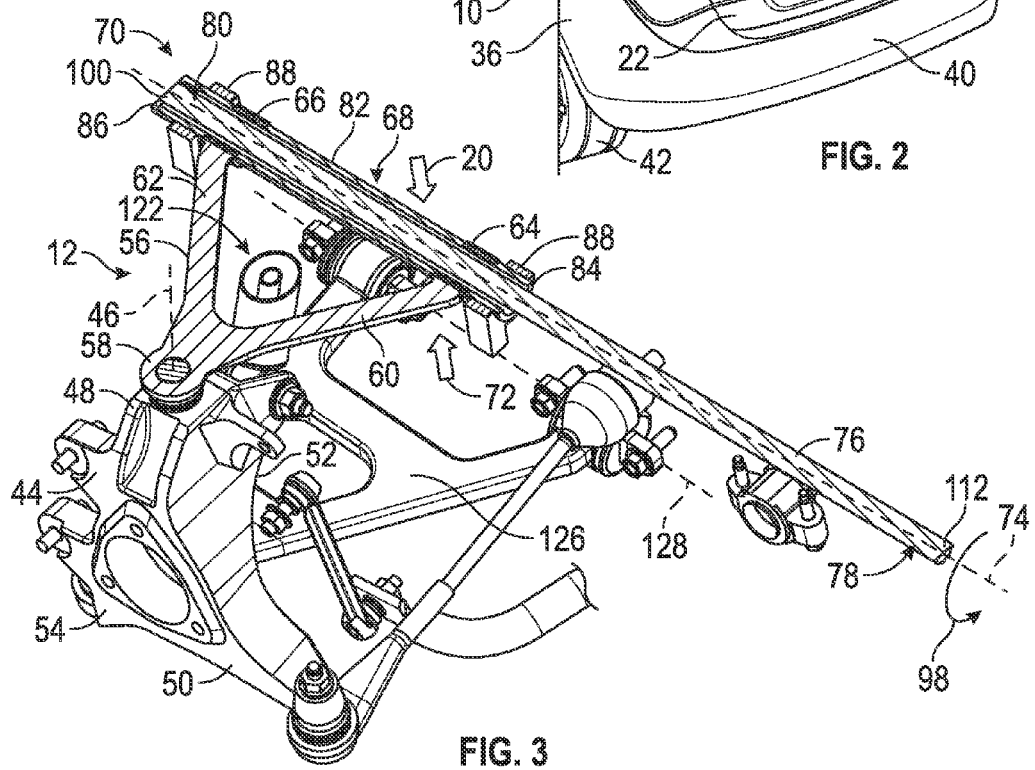
FIG. 3 is a schematic cross-sectional view of a suspension system.

Referring to FIGS. 3 and 4, the suspension system 12 includes a wheel knuckle 44. The wheel knuckle 44 is coupled to the first wheel assembly 32. Specifically, the wheel knuckle 44 is coupled to the hub of the first wheel assembly 32 such that the first wheel assembly 32 can rotate relative to the wheel knuckle 44. The downward load applied to the structure 14 is transferred to or acts on the wheel knuckle 44 generally along an axis 46. The axis 46 is transverse to the road 16.

When the first wheel assembly 32 includes the tire 42 that turns to steer the vehicle 10, the wheel knuckle 44 is pivotable with the tire 42. Specifically, when the wheel knuckle 44 pivots, the first wheel assembly 32 turns, for example, left or right, which steers the vehicle 10 left or right. When the first wheel assembly 32 includes the tire 42 that does not turn to steer the vehicle 10, the wheel knuckle 44 is not pivotable with the tire 42. Specifically, when the wheel knuckle 44 does not pivot, the first wheel assembly 32 does not turn, for example, left or right, to steer the vehicle 10.

As best shown in FIGS. 3 and 4, the wheel knuckle 44 can include a top segment 48 and a bottom segment 50 disposed below the top segment 48 relative to the axis 46. The wheel knuckle 44 can also include a first side 52 and a second side 54 spaced from each other transverse to the axis 46. Generally, the first side 52 faces inwardly toward the second wheel assembly 34 and the second side 54 faces outwardly away from the second wheel assembly 34. The top and bottom segments 48, 50 can each include part of the first and second sides 52, 54.

Continuing with FIGS. 3 and 4, the suspension system 12 further includes a control arm 56 coupled to the wheel knuckle 44. Furthermore, the control arm 56 is also coupled to the structure 14. Therefore, the control arm 56 couples the wheel knuckle 44 to the structure 14. The downward load applied to the structure 14 is transferred to or acts on the control arm 56, which is then transferred to or acts on the wheel knuckle and the first wheel assembly 32.

Again, continuing with FIGS. 3 and 4, the control arm 56 includes a proximal end 58 having a first arm segment 60 and a second arm segment 62 each extending outwardly from the proximal end 58 away from each other to respective first and second distal ends 64, 66 to define a space 68 between the first and second arm segments 60, 62. Specifically, the proximal end 58 of the control arm 56 is coupled to the top segment 48 of the wheel knuckle 44. Therefore, the proximal end 58 of the control arm 56 couples the wheel knuckle 44 to the structure 14. For example, a ball joint can couple the wheel knuckle 44 to the proximal end 58 of the control arm 56.

Turning to FIGS. 4-6, the suspension system 12 also includes a biasing device 70 at least partially disposed in the space 68 between the first and second arm segments 60, 62. Packaging space is reduced by at least partially disposing the biasing device 70 in the space 68. The biasing device 70 can be for the suspension system 12 of the rear 40 of the vehicle 10 or the front 142 of the vehicle 10.

The biasing device 70 provides a reaction force (the reaction force is identified by arrow 72 in FIGS. 3 and 5) that counteracts the downward load (arrow 20). The biasing device 70 is coupled to at least one of the first and second distal ends 64, 66 of the first and second arm segments 60, 62 respectively such that actuation of the biasing device 70 provides a first reaction force that counteracts the downward load acting on the control arm 56. The first reaction force is substantially proportional to the downward load to substantially maintain a position of the wheel knuckle 44. As mentioned above, the downward load is transferred to or acts on the control arm 56, which is then transferred to or acts on the wheel knuckle 44. More specifically, the biasing device 70 is coupled to at least one of the first and second distal ends 64, 66 of the first and second arm segments 60, 62 respectively such that actuation of the biasing device 70 provides the first reaction force that counteracts the downward load applied to the structure 14. The first reaction force is substantially proportional to the downward load to substantially maintain a vertical position of the structure 14 relative to the wheel knuckle 44. Therefore, counteracting the first downward load allows the structure 14 to substantially maintain its vertical position relative to the road 16. As such, the suspension system 12 can actively adjust to counteract the downward load applied to the structure 14 to substantially maintain the suspension travel, and thus the vertical position of the structure 14 relative to the road 16. Simply stated, the reaction force generally opposes the downforce load. The vertical position of the structure 14 can be the height of the structure 14 from the road 16. As such, the height of the structure 14 relative to the road 16 can be substantially maintained or changed (as discussed further below). Said differently, the vertical position can be the position of the structure 14 spaced from the road 16 or a component of the vehicle 10, such as the wheel knuckle 44, generally along the axis 46.

The phrase "at least one of" should be construed to include non-exclusive logical "or", i.e., at least one of the first distal end 64 or the second distal end 66. Therefore, in certain embodiments, the biasing device 70 is coupled to the first distal end 64 of the first arm segment 60 or the second distal end 66 of the second arm segment 62. In other embodiments, the biasing device 70 is coupled to both of the first and second distal ends 64, 66 of the first and second arm segments 60, 62, respectively.

As best shown in FIGS. 3-5, the biasing device 70 can be disposed between the first and second distal ends 64, 66 of the first and second arm segments 60, 62, respectively. Furthermore, the first and second distal ends 64, 66 can be spaced from each other along a longitudinal axis 74. As discussed further below, a portion of the biasing device 70 can extend beyond at least one of the first and second distal ends 64, 66 of the first and second arm segments 60, 62 respectively. For example, as shown in FIG. 5, a portion of the biasing device 70 extends beyond the first distal end 64 of the first arm segment 60 away from the second distal end 66 of the second arm segment 62. As another example, a portion of the biasing device 70 can extend beyond the second distal end 66 of the second arm segment 62 away from the first distal end 64 of the first arm segment 60. The interpretation of phrase "at least one of" is discussed above and will not be re-discussed.

Generally, the control arm 56 can be rotatable about the longitudinal axis 74. Therefore, when the control arm 56 rotates about the longitudinal axis 74, the structure 14 can correspondingly move upwardly or downwardly relative to the road 16 or generally along the axis 46. Furthermore, when the control arm 56 rotates about the longitudinal axis 74, the control arm 56 moves relative to the wheel knuckle 44.

The biasing device 70 provides an active suspension adjustment. For example, when track performance and/or high speed driving/cornering is desired, the spoiler 18 is moved from the retracted position to the extended position, and simultaneously or in tandem, the biasing device 70 is actuated to counteract the increased downward load applied to the structure 14 to substantially maintain the vertical position of the structure 14 relative to the road 16. As another example, when surface street performance and/or lower speed driving is desired, the spoiler 18 is moved from the extended position back to the retracted position, and simultaneously or in tandem, the biasing device 70 is actuated to change the reaction force counteracting the downward load which allows the structure 14 to change its vertical position. It is to be appreciated when the biasing device 70 and the spoiler 18 are actuated in tandem, the biasing device 70 can be actuated before or after the spoiler 18. Therefore, the downward load and the reaction force can be continuously changing depending on the desired operation of the vehicle 10.

Specifically, the biasing device 70 can operate in a first mode to provide the first reaction force that is substantially proportional to the downward load. The biasing device 70 can also operate in a second mode to provide a second reaction force that counteracts the downward load acting on the control arm 56 such that the second reaction force is different from the downward load which allows the control arm 56 to selectively rotate about the longitudinal axis 74 to change the position of the control arm 56 relative to the wheel knuckle 44. More specifically, the second mode provides the second reaction force that counteracts the downward load applied to the structure 14. Therefore, the second reaction force is different from the downward load which allows the control arm 56 to selectively rotate about the longitudinal axis 74 to change the vertical position of the structure 14 relative to the wheel knuckle 44. The biasing device 70 can be actuated in both the first and second modes. When the biasing device 70 is actuated in the second mode, the biasing device 70 is rotated to change the reaction force that counteracts the downward load.

The first reaction force and the second reaction force can be any suitable magnitude or values. The first and second reaction forces can change depending on whether the vehicle 10 is operating in the first or second mode. Furthermore, the first and second reaction forces can change depending on the downward load applied to the structure 14. The downward load can change due to the speed of the vehicle 10, the position of the spoiler 18, the amount of weight disposed in, or removed from, the vehicle 10, etc. Therefore, the first reaction force can be greater than, less than, or equal to the second reaction force depending on the magnitude of the downward load and/or the mode. Changing the reaction force allows the structure 14 to move closer to the road 16, i.e., decrease the clearance between the structure 14 and the road 16 or move farther from the road 16, i.e., increase the clearance between the structure 14 and the road 16. For example, when the reaction force is less than the downward load, the structure 14 can move closer to the road 16. As another example, when the reaction force is greater than the downward load, the structure 14 can move away from the road 16. Furthermore, when the downward load changes, due to changes in speed of the vehicle 10 or the position of the spoiler 18, the first reaction force can change accordingly to substantially maintain the vertical position of the structure 14 relative to the road 16, or the second reaction force can change accordingly to allow the vertical position of the structure 14 to change relative to the road 16. Therefore, the downward load and the reaction force can be continuously changing.

Referring to FIGS. 3 and 4, the biasing device 70 can include a torsion bar 76 disposed in the space 68 and extending along the longitudinal axis 74. Positioning the torsion bar 76 in the space 68 between the first and second distal ends 64, 66 provide compact packaging of the biasing device 70. In certain embodiments, the torsion bar 76 is concentric or coaxial with the longitudinal axis 74. The torsion bar 76 can include a first end portion 78 and a second end portion 80 spaced from each other along the longitudinal axis 74. One of the first and second end portions 78, 80 of the torsion bar 76 is affixed while the other one of the first and second end portions 78, 80 is rotatable to apply a torsional load to the torsion bar 76. Simply stated, torque can be applied to the torsion bar 76 to provide the first reaction force that counteracts the downward load. Therefore, torque can be applied to the torsion bar 76 when in the first mode, and torque applied to the torsion bar 76 can be changed when in the second mode. Therefore, torque can be applied to the torsion bar 76 in both the first and second modes, and can change depending on the magnitude of the downward load and/or the mode. The torsional load is transferred to or acts on the control arm 56 as the reaction force that counteracts the downward load. The reaction force can be directed generally upwardly through the control arm 56 and the wheel knuckle 44 to counteract the downward load which is directed generally downwardly through the control arm 56 and the wheel knuckle 44. Generally, the biasing device 70 acts or functions as an adjustable load spring.

Additionally, continuing with FIGS. 3 and 4, the biasing device 70 can include a housing 82 attached to one of the first and second distal ends 64, 66 of the first and second arm segments 60, 62 respectively to couple the biasing device 70 to the control arm 56. Therefore, in certain embodiments, the housing 82 is attached to the first distal end 64 of the first arm segment 60 or the second distal end 66 of the second arm segment 62. In other embodiments, the housing 82 is attached to both of the first and second distal ends 64, 66 of the first and second arm segments 60, 62, respectively to couple the biasing device 70 to the control arm 56. The housing 82 is attached to the control arm 56 such that the reaction force is transferred or acts on the control arm 56 through the housing 82.

The housing 82 can be rotatable about the longitudinal axis 74. As such, the housing 82 is attached to one, or both, of the first and second distal ends 64, 66 such that the control arm 56 and the housing 82 are selectively rotatable about the longitudinal axis 74 as a unit. Simply stated, the housing 82 is attached to the control arm 56 such that the housing 82 and the control arm 56 can rotate about the longitudinal axis 74 as the unit or in unison. Therefore, for example, the biasing device 70 can be coupled to both of the first and second distal ends 64, 66 of the first and second arm segments 60, 62 respectively, such that the control arm 56 and the housing 82 are selectively rotatable as the unit.

Referring to FIGS. 3-5, in certain embodiments, the housing 82 can include a first end 84 and a second end 86 spaced from each other along the longitudinal axis 74. The first and/or second distal ends 64, 66 of the first and second arm segments 60, 62 respectively can be attached to the housing 82. In certain embodiments, the first distal end 64 is attached adjacent to the first end 84 of the housing 82 and/or the second distal end 66 is attached adjacent to the second end 86 of the housing 82. Furthermore, in certain embodiments, the first end 84 of the housing 82 is disposed beyond the first distal end 64 of the first arm segment 60 away from the space 68 and/or the second end 86 of the housing 82 is disposed beyond the second distal end 66 of the second arm segment 62 away from the space 68. Simply stated, the first and second ends 84, 86 of the housing 82 are spaced from the space 68 between the first and second arm segments 60, 62. In other words, the first and second ends 84, 86 of the housing 82 are not disposed in the space 68 between the first and second arm segments 60, 62.

Continuing with FIGS. 3-5, the suspension system 12 can also include at least one bushing or bearing 88 coupled to the housing 82. The bushing or bearing 88 can minimize friction between the housing 82 and the bushing 88 during rotation of the housing 82 about the longitudinal axis 74. In certain embodiments, a plurality of bushings or bearings 88 are utilized. Generally, the bushings or bearings 88 surround the outside of the housing 82 and can support the housing 82. One bushing or bearing 88 can be disposed adjacent to the first end 84 of the housing 82 and another bushing or bearing 88 can be disposed adjacent to the second end 86 of the housing 82. As such, in certain embodiments, the bushings or bearings 88 are disposed outside of the space 68 between the first and second arm segments 60, 62. In other words, the bushings or bearings 88 are spaced from the space 68 between the first and second arm segments 60, 62. Therefore, in certain embodiments, one bushing or bearing 88 is disposed between the first end 84 of the housing 82 and the first distal end 64 of the first arm segment 60 and another bushing or bearing 88 is disposed between the second end 86 of the housing 82 and the second distal end 66 of the second arm segment 62. Simply stated, the bushings or bearings 88 can be disposed outside of the first and second arm segments 60, 62. It is to be appreciated that the bushing(s) or bearing(s) 88 can be in any suitable location.

Furthermore, the bushings 88 are secured to the structure 14. For example, the bushings 88 can be disposed between a pair of ribs 90 on the frame. Specifically, the bushings 88 can include a pair of feet 92 wedged between the pair of ribs 90 to secure the bushings 88 to the structure 14. It is to be appreciated that the bushings 88 can be secured or attached to the structure 14 in any suitable location, configuration and/or method. The feet 92 transfer the downward load applied to the structure 14 to the housing 82, the control arm 56, the wheel knuckle 44 and thus the first wheel assembly 32. Furthermore, the reaction force is transferred from the housing 82 and the control arm 56 to counteract the downward load. Simply stated, the downward load applied to the structure 14 acts on or is transferred to the bushings 88, and this downward load acts on, or is transferred to, the housing 82, and thus the control arm 56, through the bushings 88. The bushings/bearings 88 can be pillow block bushings/bearings. It is to be appreciated that the bushing(s) or bearing(s) 88 can be any suitable configuration.

As best shown in FIG. 3, the torsion bar 76 can be at least partially disposed inside the housing 82. For example, the housing 82 can have a first length 94 and the torsion bar 76 can have a second length 96 greater than the first length 94 such that the torsion bar 76 extends outside of the housing 82. Generally, a portion of the second length 96 of the torsion bar 76 can be inside the housing 82 and another portion of the torsion bar 76 can extend outside of the housing 82. It is to be appreciated that the housing 82 and the torsion bar 76 can be any suitable length. Furthermore, the torsion bar 76 can be any suitable thickness. Additionally, a portion of the torsion bar 76 can extend beyond at least one of the first and second distal ends 64, 66 of the first and second arm segments 60, 62 respectively. For example, as shown in FIG. 5, a portion of the torsion bar 76 extends beyond the first distal end 64 of the first arm segment 60 away from the second distal end 66 of the second arm segment 62. As another example, a portion of the torsion bar 76 can extend beyond the second distal end 66 of the second arm segment 62 away from the first distal end 64 of the first arm segment 60. In one configuration, about 20% of the second length 96 of the torsion bar 76 extends beyond the second distal end 66 of the second arm segment 62 away from the first distal end 64 of the first arm segment 60. It is to be appreciated that the torsion bar 76 can be any suitable location relative to the control arm 56.

In certain embodiments, the second end portion 80 (of the torsion bar 76) is affixed to the housing 82 and the first end portion 78 is disposed outside of the housing 82. Specifically, the second end portion 80 of the torsion bar 76 can be affixed to the housing 82, and more specifically, affixed to the second end 86 of the housing 82. The second end portion 80 being affixed to the housing 82 provides the fixed point that the torsion bar 76 can twist or rotate relative to. Therefore, rotation of the torsion bar 76 provides the torsional load which is transferred to or acts on the control arm 56 as the reaction force that counteracts the downward load. Specifically, torque applied to the torsion bar 76 by rotating or twisting the torsion bar 76 creates a moment (torsional load) that is transferred to or acts on the housing 82/control arm 56 which creates the reaction force to counteract the downward load.

Generally, the torsion bar 76 is spaced from the housing 82, except at the attachment point between the second end portion 80 and the second end 86 of the housing 82, which minimizes frictional engagement during rotation of the torsion bar 76. Having the second end portion 80 of the torsion bar 76 affixed to the second end 86 of the housing 82, allows the reaction force provided by the biasing device 70 to be transferred to the housing 82 and the control arm 56 to counteract the downward load. Therefore, when the biasing device 70 operates in the first mode, the torsion bar 76 is twisted or rotated, and thus, applies the first reaction force to the housing 82 which acts on the control arm 56 to counteract the downward load. When the biasing device 70 operates in the second mode, the torsion bar 76 is twisted or rotated in the same direction or the opposite direction that the torsion bar 76 was rotated in the first mode, and thus, applies the second reaction force to the housing 82 which acts on the control arm 56 to counteract the downward load.

A portion of the torsion bar 76 can be selectively rotatable about the longitudinal axis 74. Specifically, one end of the torsion bar 76 is affixed to the housing 82 to prevent rotation of that end while the other end of the torsion bar 76 is rotatable to twist or partially untwist the torsion bar 76. For example, the first end portion 78 of the torsion bar 76 is selectively rotatable about the longitudinal axis 74 to apply the torsional load to the torsion bar 76 to provide the first and second reaction forces that counteract the downward load. Therefore, when the spoiler 18 is extended to the desired position, the downward load is applied to the structure 14 which acts on the control arm 56, and thus, the housing 82 of the biasing device 70, and rotating the torsion bar 76 causes the torsion bar 76 to apply the torsional load to the housing 82, and thus the control arm 56, to counteract the downward load. For example, when the first end portion 78 of the torsion bar 76 is rotated counterclockwise as indicated by arrow 98 (see FIGS. 3 and 4), the torsional load increases. It is to be appreciated that the torsion bar 76 can be attached to the housing 82 in other configurations than illustrated such that clockwise rotation of the torsion bar 76 can increase the torsional load instead of counterclockwise rotation.

A distal portion 100 of the second end portion 80 of the torsion bar 76 and the second end 86 of the housing 82 can be splined to each other to prevent rotation of the torsion bar 76 at that attachment point. Generally, the splines of the second end 86 of the housing 82 are disposed inside the housing 82 to cooperate with the splines of the distal portion 100 of the second end portion 80 of the torsion bar 76. It is to be appreciated that the second end portion 80 of the torsion bar 76 can be affixed to the housing 82 in other suitable configurations, such as keyed, flats, tapered, etc., or affixed to the housing 82 by any suitable methods, such as welding, adhesive, etc.

Referring to FIGS. 4 and 5, the biasing device 70 can include an actuator 102 coupled to the first end portion 78 of the torsion bar 76 to selectively rotate the first end portion 78 of the torsion bar 76. Furthermore, the actuator 102 is affixed to the structure 14. Therefore, the actuator 102 supports the first end portion 78 of the torsion bar 76. For example, the actuator 102 can be affixed to the structure 14. In certain embodiments, the actuator 102 is affixed to the frame adjacent to a bumper beam 104. In other embodiments, the actuator 102 is affixed to the bumper beam 104. The bumper beam 104 can extend across the vehicle 10 (see FIG. 6), such as between the first and second wheel assemblies 32, 34. It is to be appreciated that the actuator 102 can be affixed to the structure 14 in any suitable location. The actuator 102 is removed from FIG. 3 for illustrative purposes only.

Continuing with FIGS. 4 and 5, in certain embodiments, the actuator 102 can include a motor 106 (referred to as a second motor 106 herein) coupled to the first end portion 78 of the torsion bar 76 to selectively rotate the first end portion 78 of the torsion bar 76. Furthermore, the actuator 102 can include a drive mechanism 108 coupled to the second motor 106 and the first end portion 78 of the torsion bar 76 to selectively rotate the first end portion 78 of the torsion bar 76. For example, actuation of the second motor 106 moves, turns or drives the drive mechanism 108 that rotates the first end portion 78 of the torsion bar 76. The drive mechanism 108 can be a planetary gear set, a multi-stage planetary gear set, a belt drive or any other suitable mechanism to rotate and maintain the desired position of the torsion bar 76. In certain embodiments, optionally, when the drive mechanism 108 is a planetary gear set, the planetary gear set can be concentric or coaxial with the longitudinal axis 74. The second motor 106 can be an electro-mechanical motor, an electric motor or any other suitable mechanism to operate the drive mechanism 108. It is to be appreciated that a position sensor 110 can be coupled to the torsion bar 76, the drive mechanism 108 and/or a part of the second motor 106 to sense the position of the torsion bar 76 and/or the drive mechanism 108.

The second end portion 80 of the torsion bar 76 is affixed to the housing 82 to prevent rotation of that end while the first end portion 78 of the torsion bar 76 is rotatable when the second motor 106 is actuated to twist or partially untwist the torsion bar 76. A distal portion 112 of the first end portion 78 of the torsion bar 76 can be splined and a portion of the drive mechanism 108 can be splined to cooperate with the distal portion 112 of the first end portion 78. Therefore, movement of the drive mechanism 108 correspondingly rotates the first end portion 78 of the torsion bar 76. It is to be appreciated that the first end portion 78 of the torsion bar 76 and the drive mechanism 108 can be coupled to each other in any suitable configurations, such as keyed, flats, tapered, etc., or coupled to each other by any suitable methods, such as welding, adhesive, etc. It is to also be appreciated that the first end portion 78 of the torsion bar 76 and the drive mechanism 108 can be coupled to each other by any suitable configurations/ components to rotate the torsion bar 76.

Actuation of the actuator 102 can rotate the first end portion 78 of the torsion bar 76 to the desired position to apply the desired reaction force that counteracts the downward load being applied to the structure 14. A controller 114 can be utilized to selectively actuate the biasing device 70, and more specifically, the actuator 102 to rotate the torsion bar 76 to the desired position. Generally, the controller 114 can be part of an electronic control module that is in communication with various components of the vehicle 10. For example, the controller 114 can be in communication with the first and second motors 28, 106, as well as the position sensors 30, 110 when utilized. As another example, the controller 114 can communicate with a speed sensor 116 to determine the speed the vehicle 10 is traveling. The speed of the vehicle 10 can be utilized by the controller 114 to determine aerodynamic information and thus determine the downward load being applied to the structure 14. Specifically, the controller 114 can compile data from the sensors 30, 110, 116, as well as calculate data, to move the spoiler 18 to the desired position and drive the drive mechanism 108 to rotate the torsion bar 76 to the desired position. Simply stated, the controller 114 can signal the actuator 102 to operate in one of the first and second modes. It is to be appreciated that more than one controller 114 can be utilized and can be in communication with each other.

The controller 114 includes a processor 118 and a memory 120 on which is recorded instructions for communicating with the spoiler 18, the actuator 102, the speed sensor 116 and/or the position sensors 30, 110. The controller 114 is configured to execute the instructions from the memory 120, via the processor 118. For example, the controller 114 can be a host machine or distributed system, e.g., a computer such as a digital computer or microcomputer, acting as a vehicle control module, and/or as a proportional-integral-derivative (PID) controller device having a processor, and, as the memory 120, tangible, non-transitory computer-readable memory such as read-only memory (ROM) or flash memory. The controller 114 can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller 114 can include all software, hardware, memory 120, algorithms, connections, sensors, etc., necessary to monitor and control the first and second motors 28, 106, the speed sensor 116 and the position sensors 30, 110. As such, a control method can be embodied as software or firmware associated with the controller 114. It is to be appreciated that the controller 114 can also include any device capable of analyzing data from various sensors 30, 110, 116, comparing data, making the necessary decisions required to control and monitor the first and second motors 28, 106, the speed sensor 116, the position sensors 30, 110, etc.

Therefore, the controller 114 can communicate with the actuator 102 to actively control the biasing device 70. For example, the actuator 102 can be powered when the biasing device 70 is in the first mode and/or the second mode. The controller 114 can determine the amount of torque (rotation or twist) to apply to the torsion bar 76 based on the angle of the spoiler 18 and/or the speed of the vehicle 10 and/or the amount of downward load applied to the structure 14 and/or the height of the structure 14 from the road 16 utilizing a height sensor, the amount of weight disposed in, or removed from, the vehicle 10, etc. The controller 114 can store one or more calculations or algorithms can be utilized to determine the position of the biasing device 70. Optionally, a transducer can be in communication with the controller 114 and the actuator 102 to assist in controlling the position of the biasing device 70, and specifically, the torsion bar 76.

Additionally, optionally, the actuator 102 can also include one or more stops to limit one or more directions of rotation of the torsion bar 76. Therefore, when utilizing the stops, one stop can limit rotation of the torsion bar 76 to a minimum torque applied to the torsion bar 76 and another stop can limit rotation of the torsion bar 76 to a maximum torque applied to the torsion bar 76.

Turning to FIG. 4, the suspension system 12 can further include a piston shock absorber 122 coupled to the wheel knuckle 44 and partially disposed in the space 68 between the first and second arm segments 60, 62. In certain embodiments, the piston shock absorber 122 is coupled to the structure 14 and the first side 52 of the wheel knuckle 44. The piston shock absorber 122 extends through the space 68, and thus, a portion of the piston shock absorber 122 is disposed above the control arm 56 and a portion of the piston shock absorber 122 is disposed below the control arm 56. In other words, a portion of the piston shock absorber 122 is disposed above the longitudinal axis 74 relative to the axis 46 and a portion of the piston shock absorber 122 is disposed below the longitudinal axis 74 relative to the axis 46. Therefore, the control arm 56 and the housing 82 of the biasing device 70 cooperate to surround a portion of the piston shock absorber 122.

The piston shock absorber 122 can include a cylinder having a piston movably disposed inside the cylinder. The piston shock absorber 122 dampens movement of the structure 14 or sprung mass of the vehicle 10 as the vehicle 10 travels over the road 16. For example, the piston shock absorber 122 can dampen movement of the structure 14 as the vehicle 10 moves over bumps, holes, etc. The biasing device 70 can also dampen movement of the structure 14, in addition to, the biasing device 70 being able to substantially maintain the vertical position of the structure 14 when in the first mode or change the vertical position of the structure 14 when in the second mode.

The piston shock absorber 122 is operable without utilizing a coil spring surrounding the cylinder. Simply stated, the piston shock absorber 122 does not utilize a coil spring as discussed in the background section above.

In certain embodiments, the control arm 56 is further defined as a first control arm 56 (and will be referred to as the first control arm 56 in the below discussion) and the suspension system 12 can further include a second control arm 126 (see FIGS. 3 and 4) spaced from the first control arm 56. The second control arm 126 is also coupled to the wheel knuckle 44. Specifically, the second control arm 126 is coupled to the bottom segment 50 of the wheel knuckle 44. Additionally, the second control arm 126 is coupled to the structure 14. Therefore, generally, the second control arm 126 couples the wheel knuckle 44 to the structure 14. For example, a ball joint can couple the wheel knuckle 44 to the second control arm 126.

As best shown in FIG. 4, in certain embodiments, the first control arm 56 is coupled to the wheel knuckle 44 above the second control arm 126. In other words, the second control arm 126 is disposed below the first control arm 56, and thus the second control arm 126 is disposed closer to the road 16 than the first control arm 56. Simply stated, the second control arm 126 is disposed below the longitudinal axis 74 relative to the axis 46. The first control arm 56 can be referred to as an upper control arm and the second control arm 126 can be referred to as a lower control arm.

Referring to FIG. 3, the second control arm 126 is rotatable about a first axis 128 spaced from the longitudinal axis 74. In certain embodiments, the first axis 128 and the longitudinal axis 74 can be spaced and substantially parallel to each other. When the first and/or second control arms 56, 126 rotate about the longitudinal axis 74 and the first axis 128 respectively, the structure 14 correspondingly moves relative to the road 16. For example, the structure 14 can move upwardly or downwardly relative to the wheel knuckle 44, the road 16 or the axis 46.

As shown in FIG. 6, the suspension system 12 can include suspension components on both sides of the vehicle 10. As such, the components discussed above can be duplicated for the other side of the vehicle 10. In other words, suspension components can be coupled to the second wheel assembly 34. Therefore, one biasing device 70 is utilized for the first wheel assembly 32 and a second biasing device 130 can be utilized for the second wheel assembly 34. As such, a second wheel knuckle 132 can be coupled to the second wheel assembly 34; a third control arm 134, that can also be referred to as an upper control arm, can be coupled to the second wheel knuckle 132; a fourth control arm 136, that can also be referred to as a lower control arm, can be coupled to the second wheel knuckle 132; a second piston shock absorber 138 can be coupled to the second wheel knuckle 132; a second actuator 140, etc. Each of these additional suspension components can have the same features as discussed above with the difference being that these components are operative along the opposite side of the vehicle 10.

Furthermore, the controller 114, as discussed above, can communicate with both of the biasing devices 70, 130, and thus both of the actuators 102, 140 to provide the desired amount of torsional load to respective torsion bars 76. For example, the controller 114 can communicate with each of the actuators 102, 140 to provide substantially proportional, or substantially the same, torsional load to each of the torsion bars 76, to provide the substantially proportional, or substantially the same, reaction force on both sides of the vehicle 10 that counteracts the downward load. Alternatively, the controller 114 can communicate with each of the actuators 102, 140 to provide different torsional loads to each of the torsion bars 76, to provide different reaction forces on the sides of the vehicle 10 that counteracts the downward load.

The suspension system 12 described herein is arranged to provide compact packaging of the suspension system 12 in the vehicle 10. Additionally, the biasing devices 70, 130 can provide active control to substantially maintain the vertical position of the structure 14 and/or change the vertical position of the structure 14. Furthermore, the biasing devices 70, 130 can actively control pitch and/or roll of the structure 14.

Pitch movement can occur when the vehicle 10 is accelerating or braking, which causes forwardly or backwardly rocking of the structure 14. Therefore, the controller 114 can actuate the actuators 102, 140 to minimize pitch of the structure 14. Generally, the controller 114 can utilize any of the data/information, etc. as discussed above, as well as acceleration/braking data of the vehicle 10, to determine the desired positions of the biasing devices 70, 130 to minimize pitch.

Roll movement can occur when the vehicle 10 is cornering (moving through a turn/curve), which causes the structure 14 to rock away from the center of the turn. Therefore, the controller 114 can actuate the actuators 102, 140 to minimize roll of the structure 14. Generally, the controller 114 can utilize any of the data/information, etc. as discussed above, to determine the desired positions of the biasing devices 70, 130 to minimize roll.

Furthermore, when a predetermined axial force is applied to the front 142 or the rear 40 of the vehicle 10, the positioning of the biasing devices 70, 130 adjacent to the bumper beam 104 allows the torsion bars 76 to disengage in certain situations and translate into the bumper beam 104 to minimize reinforcement of structural rails of the vehicle 10 which allows the structural rails to displace to absorb energy, and/or allows the torsion bars 76 to deform in certain situations to absorb energy. Additionally, the biasing devices 70, 130 can be actuated by the controller 114 to act as a stabilizer for the vehicle 10.

While the best modes for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A suspension system for a vehicle, the system comprising:
   a wheel knuckle;
   a control arm coupled to the wheel knuckle, with the control arm including a proximal end having a first arm segment and a second arm segment each extending outwardly from the proximal end away from each other to respective first and second distal ends to define a space between the first and second arm segments;
   a biasing device at least partially disposed in the space between the first and second arm segments, with the biasing device coupled to at least one of the first and second distal ends of the first and second arm segments respectively such that actuation of the biasing device provides a first reaction force that counteracts a downward load acting on the control arm, with the first reaction force being substantially proportional to the downward load to substantially maintain a position of the wheel knuckle.

2. A system as set forth in claim 1 wherein the biasing device is disposed between the first and second distal ends of the first and second arm segments respectively, with the first and second distal ends spaced from each other along a longitudinal axis, and wherein the biasing device operates in a first mode to provide the first reaction force being substantially proportional to the downward load and a second mode to provide a second reaction force that counteracts the downward load acting on the control arm such that the second reaction force is different from the downward load which allows the control arm to selectively rotate about the longitudinal axis to change the position of the control arm relative to the wheel knuckle.

3. A system as set forth in claim 1 wherein the biasing device includes a torsion bar disposed in the space and extending along a longitudinal axis.

4. A system as set forth in claim 3 wherein the biasing device includes a housing attached to one of the first and second distal ends of the first and second arm segments respectively to couple the biasing device to the control arm, with the control arm and the housing being selectively rotatable about the longitudinal axis as a unit, and with the torsion bar at least partially disposed inside the housing.

5. A system as set forth in claim 3 wherein the biasing device includes a housing attached to both of the first and second distal ends of the first and second arm segments respectively to couple the biasing device to the control arm, with the control arm and the housing being selectively rotatable about the longitudinal axis as a unit, and with the torsion bar at least partially disposed inside the housing.

6. A system as set forth in claim 5 wherein the housing has a first length and the torsion bar has a second length greater than the first length such that the torsion bar extends outside of the housing.

7. A system as set forth in claim 6 wherein the torsion bar includes a first end portion and a second end portion spaced from each other along the longitudinal axis, with the second end portion being affixed to the housing and the first end portion being disposed outside of the housing, and wherein the first end portion of the torsion bar is selectively rotatable about the longitudinal axis to apply a torsional load to the torsion bar to provide the first reaction force that counteracts the downward load.

8. A system as set forth in claim 7 wherein the biasing device includes an actuator coupled to the first end portion of the torsion bar to selectively rotate the first end portion of the torsion bar.

9. A system as set forth in claim 8 wherein the actuator includes a motor coupled to the first end portion of the torsion bar to selectively rotate the first end portion of the torsion bar.

10. A system as set forth in claim 9 wherein the actuator includes a drive mechanism coupled to the motor and the first end portion of the torsion bar to selectively rotate the first end portion of the torsion bar.

11. A system as set forth in claim 1 wherein the control arm is further defined as a first control arm and further including a second control arm spaced from the first control arm, with the second control arm coupled to the wheel knuckle.

12. A system as set forth in claim 11 wherein the first control arm is coupled to the wheel knuckle above the second control arm.

13. A system as set forth in claim 1 further including a piston shock absorber coupled to the wheel knuckle and partially disposed in the space between the first and second arm segments.

14. A system as set forth in claim 1 wherein the biasing device is coupled to both of the first and second distal ends of the first and second arm segments respectively to couple the biasing device to the control arm, with the control arm and the housing being selectively rotatable as a unit.

15. A vehicle comprising:
a structure;
a suspension system supporting the structure, the system comprising:
a wheel knuckle;
a control arm coupled to the wheel knuckle, with the control arm including a proximal end having a first arm segment and a second arm segment each extending outwardly from the proximal end away from each other to respective first and second distal ends to define a space between the first and second arm segments; and
a biasing device at least partially disposed in the space between the first and second arm segments, with the biasing device coupled to at least one of the first and second distal ends of the first and second arm segments respectively such that actuation of the biasing device provides a first reaction force that counteracts a downward load applied to the structure, with the first reaction force being substantially proportional to the downward load to substantially maintain a vertical position of the structure relative to the wheel knuckle.

16. A vehicle as set forth in claim 15 wherein the biasing device is disposed between the first and second distal ends of the first and second arm segments respectively, with the first and second distal ends spaced from each other along a longitudinal axis, and wherein the biasing device operates in a first mode to provide the first reaction force being substantially proportional to the downward load and a second mode to provide a second reaction force that counteracts the downward load applied to the structure, with the second reaction force being different from the downward load which allows the control arm to selectively rotate about the longitudinal axis to change the vertical position of the structure relative to the wheel knuckle.

17. A vehicle as set forth in claim 15 wherein the biasing device includes a torsion bar disposed in the space and extending along a longitudinal axis.

18. A vehicle as set forth in claim 17 wherein the biasing device includes a housing attached to both of the first and second distal ends of the first and second arm segments respectively to couple the biasing device to the control arm, with the control arm and the housing being selectively rotatable about the longitudinal axis as a unit, and with the torsion bar at least partially disposed inside the housing.

19. A vehicle as set forth in claim 18 wherein the housing has a first length and the torsion bar has a second length greater than the first length such that the torsion bar extends outside of the housing, and wherein the torsion bar includes a first end portion and a second end portion spaced from each other along the longitudinal axis, with the second end portion being affixed to the housing and the first end portion being disposed outside of the housing, and wherein the first end portion of the torsion bar is selectively rotatable about the longitudinal axis to apply a torsional load to the torsion bar to provide the first reaction force that counteracts the downward load.

20. A vehicle as set forth in claim 19 wherein the biasing device includes an actuator coupled to the first end portion of the torsion bar to selectively rotate the first end portion of the torsion bar.

* * * * *